(12) United States Patent
Kuhns

(10) Patent No.: US 6,261,050 B1
(45) Date of Patent: Jul. 17, 2001

(54) TELESCOPING AUGER TUBE

(75) Inventor: Abe B. Kuhns, Arthur, IL (US)

(73) Assignee: E–Z Trail, Inc., Arthur, IL (US)

( * ) Notice: Subject to any disclaimer, the term of this patent is extended or adjusted under 35 U.S.C. 154(b) by 0 days.

(21) Appl. No.: 09/597,314

(22) Filed: Jun. 20, 2000

(51) Int. Cl.[7] .............................. B65G 33/00; B60P 1/40
(52) U.S. Cl. ...................... 414/526; 198/671; 414/523
(58) Field of Search ............................ 198/670, 632, 198/671, 657; 414/519, 526, 523

(56) References Cited

U.S. PATENT DOCUMENTS

| 2,425,681 | * | 8/1947 | Lewis et al. | 198/671 |
| 3,722,715 | * | 3/1973 | Young | 198/671 X |
| 4,846,621 | * | 7/1989 | Warsaw | 414/523 X |
| 5,013,208 | * | 5/1991 | Grieshop | 414/523 X |

FOREIGN PATENT DOCUMENTS

608379 * 9/1960 (IT) ..................................... 198/657

OTHER PUBLICATIONS

"Operator Manual and Parts Book—475, 500, 700, 850, Grain Carts", 1998, E–Z Trail Inc., 8 pp.

* cited by examiner

*Primary Examiner*—Steven A. Bratlie
(74) *Attorney, Agent, or Firm*—Cook, Alex, McFarron, Manzo, Cummings & Mehler, Ltd.

(57) ABSTRACT

A system and auger assembly for conveying a solid granular material includes a rotatable auger, a first auger tube and a second auger tube telescopically recieved in the first auger tube. A drive mechanism longitudinally moves the second tube between a first position in which the second tube extends from the first tube and over a remaining portion of the length of the auger, and a second position in which the second tube is telescopically recieved within the first auger tube.

38 Claims, 2 Drawing Sheets

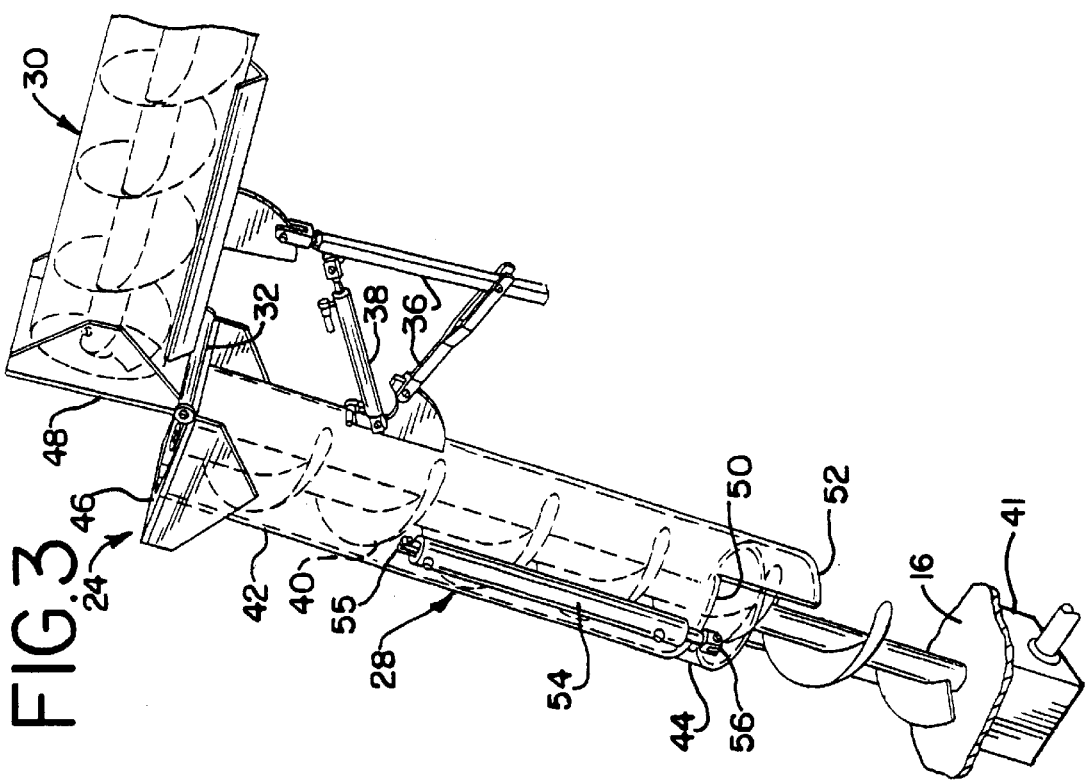
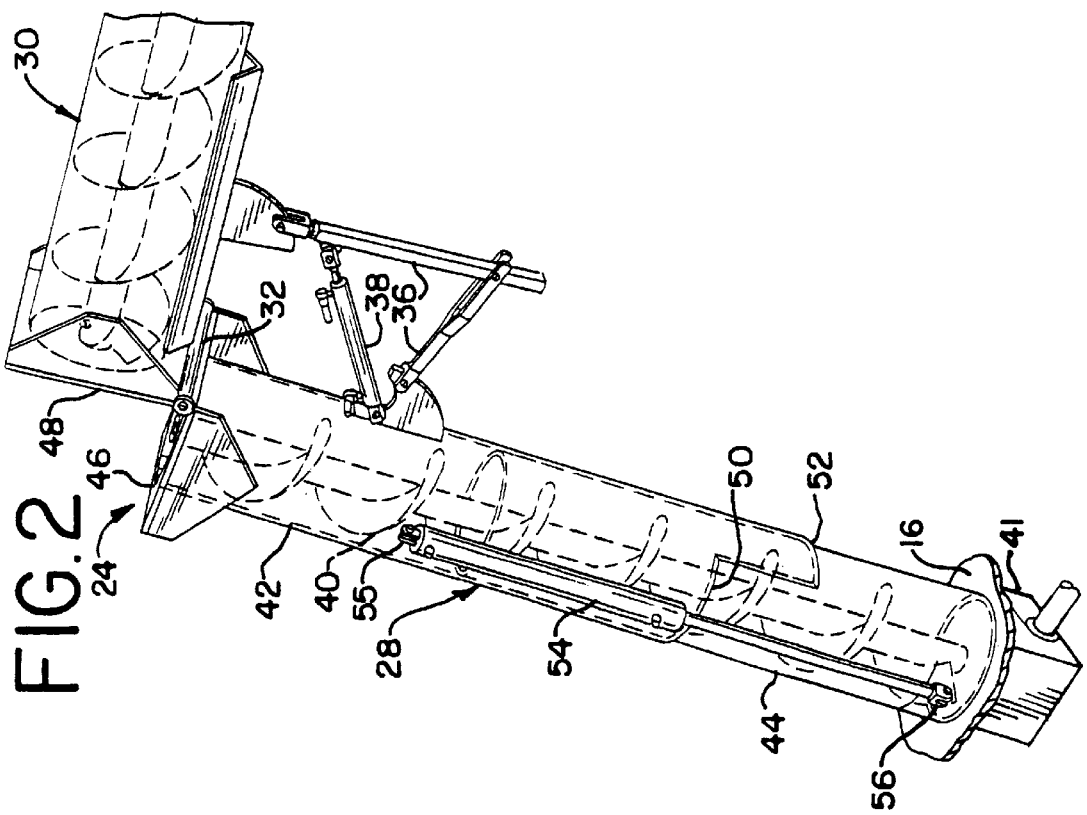

TELESCOPING AUGER TUBE

BACKGROUND AND SUMMARY OF THE INVENTION

The present invention relates to a system for the handling of solid granular materials and, more particularly, a system and an auger assembly for the conveying of such materials.

Transportable hoppers such as grain carts have been employed in the past for the transport of granular materials such as grain. These grain carts have been unloaded either by the gravity from the bottom of the hopper, or from the top of the hopper by a powered auger screw conveyer which extends from adjacent the bottom of the hopper to adjacent its top where the discharge of the grain may be accurately directed. These powered auger screw conveyors are contained over at least an upper portion of their length by a tube which is stationarily attached, such as by welding, to one of the inclined walls of the hopper. The remaining lower portion of the auger screw toward the bottom of the hopper is covered by a generally flat door which slides on slide rails to cover the lower portion of the auger screw when the grain cart is empty, but to expose the lower portion of the screw when it is desired to unload grain from the hopper.

Such sliding cover door assemblies suffer several disadvantages. One disadvantage is that the slide assembly slows unloading. Another disadvantage is that bulky granular material can bridge from the slide assembly to the walls of the hopper, hindering free flow into the auger screw. Still another disadvantage is that the granular material, for example grain, tends to abrade and wear the auger tube itself necessitating that the auger tube must be replaced after time. Such replacement is relatively difficult, expensive and time consuming where the auger tube is stationarily fixed, such as by welding, to a side wall of the grain cart hopper as they have typically been in the past.

It is the purpose of the present invention to overcome these several disadvantages. In the present invention, two auger tubes are provided. A first auger tube is provided as in the past which surrounds at least a portion of the auger and is stationarily fixed to an inclined sidewall of the hopper. The second auger tube is moveable telescopically into and out of the first tube between a first position in which the second tube extends from the first tube to cover the auger, and a second position in which the second tube is telescopically withdrawn into the first tube to expose the auger for operation. In the second position the second tube surrounds the auger and is positioned between the auger and the interior wall of the first tube to protect the first tube against abrasion and wear during operation.

The telescoping first and second auger tubes of the invention substantially speed the unloading process over the prior sliding door-slide rail constructions, and minimize bridging. In the present invention the need for the door slide rails as in the prior constructions is eliminated, and the second tube lines the first tube and protects it against abrasion. Although abrasion of the second tube may occur, it is not stationarily welded to the inclined sidewall of the hopper as is the first tube, and is much more easily and inexpensively replaced than the difficult to replace tubes which are welded to the side wall.

In one principal aspect of the present invention, an auger assembly for conveying a solid granular material comprises an elongate rotatable auger; a first tube at least partially surrounding the auger over a first portion of the length of the elongate auger; and a coupling for coupling the auger to a source of power for transmitting power to the auger to rotate the auger in the first tube. A second tube also at least partially surrounds the auger over a portion of the length of the elongate auger. A drive mechanism longitudinally moves the second tube between a first position in which the second tube extends from the first tube, and substantially over a second portion of the length of the elongate auger, and a second position in which the second tube extends over a substantial amount of the first portion and in which a substantial amount of the second portion of the length of the elongate auger is exposed.

In another principal aspect of the present invention, the tubes substantially surround the respective portions of the length of the elongate auger when the second tube is in its respective first and second positions.

In still another principal aspect of the present invention, the second tube is moved telescopically relative to the first tube when the second tube is moved between the first and second positions.

In still another principal aspect of the present invention, the second tube moves into the first tube and around the auger when it moves to the second position, and the second tube is positioned between the auger and the first tube when the second tube is in the second position.

In still another principal aspect of the present invention, the drive mechanism comprises a fluid cylinder, and preferably a hydraulic fluid cylinder.

In still another principal aspect of the present invention, the first tube is notched at an end thereof adjacent the second portion of the auger.

In still another principal aspect of the present invention, the auger assembly is in a system for the handling of a solid granular material, which system includes a hopper having a top and a bottom and inclined walls which are inclined toward each other toward the bottom of the hopper; the elongate rotatable auger extends from adjacent the bottom to adjacent the top of the hopper; and the first tube at least partially surrounds the auger over a first portion of the length of the elongate auger nearest the top of the hopper. The drive mechanism longitudinally moves the aforementioned second tube between the first position in which the second tube extends toward the bottom of the hopper, and substantially over the second portion of the length of the elongate auger, and the second position in which the second tube extends over a substantial amount of the first portion toward the top of the hopper, and in which a substantial amount of the second portion of the length of the elongate auger is exposed toward the bottom of said hopper.

These and other objects, features and advantages of the present invention will be more clearly understood through a consideration of the following detailed description.

BRIEF DESCRIPTION OF THE DRAWINGS

In the course of this description reference will be made to the attached drawings in which:

FIG. 2 is a broken perspective view of the auger assembly substantially as shown in FIG. 1, and in which the auger tube is shown in a first extended covering position in which substantially all portions of the auger are covered; and FIG. 3 is a broken perspective view of the auger assembly substantially as shown in FIG. 1, but in which the auger tube has been retracted into a second position to expose the auger screw for operation in conveying materials from the grain cart.

DESCRIPTION OF THE PREFERRED EMBODIMENT

Figure 1:
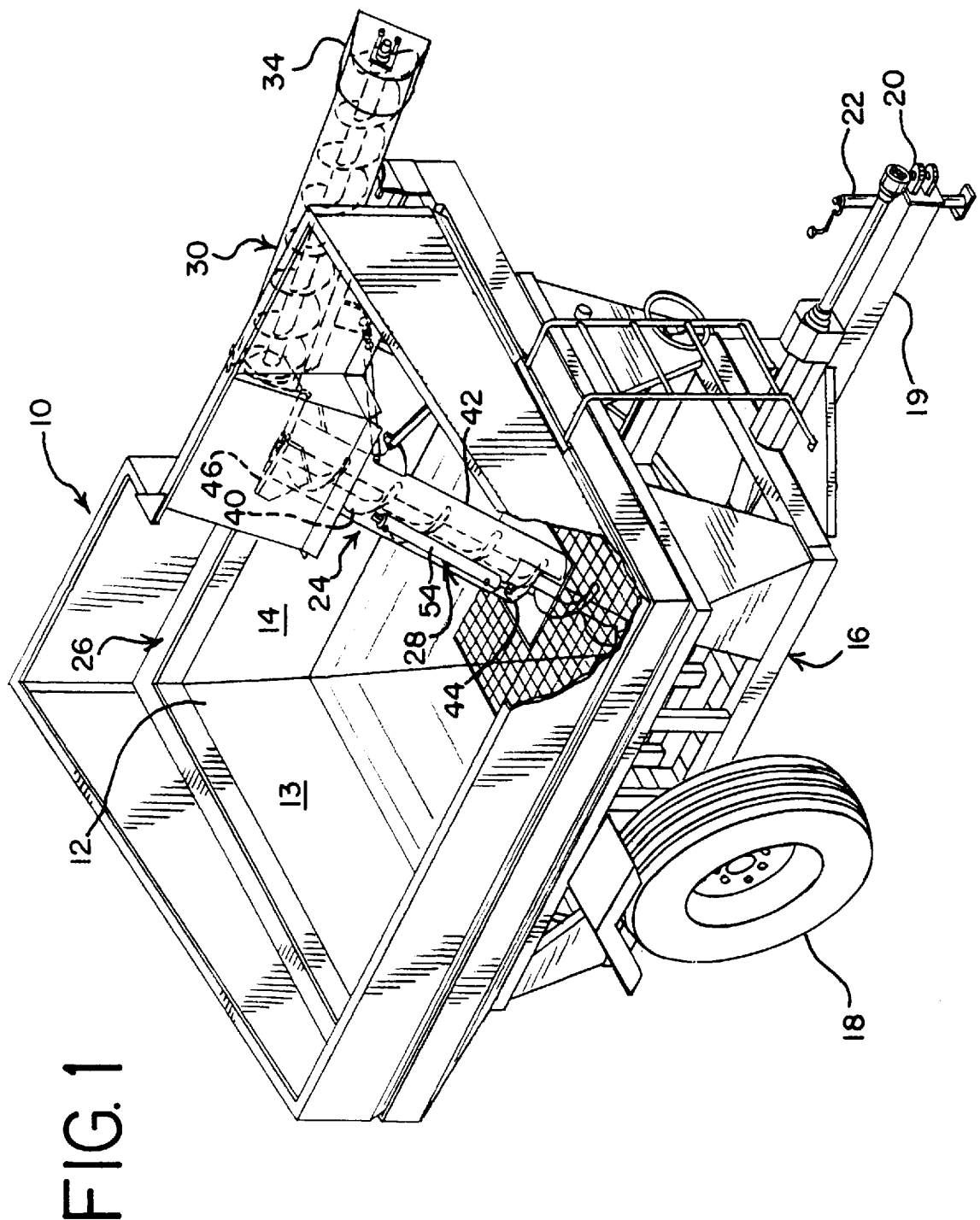
FIG. 1 is an overall perspective view of an empty grain cart having a preferred embodiment of auger assembly of the present invention.

A grain cart generally 10 is shown in FIG. 1 for the transport of grain. Such grain carts typically comprise a hopper 12 which is formed by inclined walls, two of which are shown in FIG. 1 as walls 13 and 14 which slope inwardly toward each other toward the bottom 16 generally of the grain cart. The grain cart 10 also includes various other conventional components, such as wheels 18 and a drawbar 19 with tractor hitch 20 which permits the grain cart to be transported between various locations, and a jack 22 which may be employed to support and level the drawbar 19 when the grain cart has been detached from the tractor.

Such grain carts 10 as shown in FIG. 1 may include a powered auger conveyor 24 for conveying the grain in the cart to the top 26 and over the side of the cart. As shown in FIG. 1, the auger conveyer 24 comprises a conveyer section 28 which is positioned in the grain cart hopper 12, and an extension section 30 which is preferably hingedly attached, as by hinge 32, to the top of the conveyer section 28 in the hopper. The hinge 32 makes it possible to rotate the extension section 30 to a folded transport position as shown in the drawings to facilitate transport, or to an operational position in which the extension section 30 extends in axial alignment with the conveyer section 28. When rotated to the operational position the auger screws in both sections 28 and 30 will be mechanically coupled to operate in unison and so as to convey grain in the cart to the discharge head 34 of the extension section 30 as seen in FIG. 1. Rotation of the extension section 30 about hinge 32 may either be done manually or preferably by way of linkage arms 36 and a fluid cylinder 38 as best seen in FIGS. 2 and 3.

In the present invention the conveyor section 28 that is within the hopper 12 preferably comprises an auger 40 the shaft of which extends through the bottom 16 of the hopper 12 where it is coupled to a gearbox 41 to drive the auger as seen in FIGS. 2 and 3. The auger 40 is contained in a pair of auger tubes 42 and 44. Auger tube 42 is typically fixed to the inclined sidewall 14 of the hopper 12, such as by welding, and includes a flange 46 at its top which carries the hinge 32. When the extension conveyor section 30 is rotated into its upwardly extending axially aligned operational position, the flange 46 seats against a comparable flange 48 on the extension section 30 to insure a firm coterminous alignment between the top of auger tube 42 and the auger tube of the extension section 30, and alignment of the drive shafts of the augers in the respective sections so that both augers are driven in unison.

Auger tube 42 preferably extends over the greater portion of the length of the auger 40 as best seen in FIGS. 2 and 3. However, it preferably terminates short of the lower end of the auger 40 at the bottom of the hopper 12. Auger tube 42 may be notched at 50 adjacent its bottom to form a short guide extension 52 to extend further down in partial surrounding relationship to the lower end of the auger 40.

The auger tube 44 is slightly smaller in diameter than the internal diameter of auger tube 42 to permit it to be telescopically received in auger tube 42. A fluid power cylinder 54, such as a hydraulic cylinder, is coupled at 55 at one end to the auger tube 42, and coupled at 56 at its other end to the bottom of cylinder 44.

In accordance with the present invention, the fluid power cylinder 54 is operated to telescopically move the auger tube 44 into and out of the auger tube 42. As shown in FIG. 2, when the fluid power cylinder 54 is actuated to extend its piston rod, the auger tube 44 will be extended out of the auger tube 42 so as to cover the lower, previously exposed portion of the auger. However, when it is desired to convey grain from the hopper 12 through the auger conveyor 24, the fluid power cylinder 54 is operated to retract its piston rod and pull the auger tube 44 telescopically into the auger tube 42 as shown in FIG. 3. In this position, the auger tube 44 will surround the upper portion of the auger within the auger tube 42, but will be positioned between the auger and the inner wall of the auger tube 42 to protect the inner wall of the auger tube 42 against any abrasion that may occur during the grain conveying process. When the auger tube 44 assumes the position shown in FIG. 3, the bottom few flights of the auger 40 will be exposed to the grain in the hopper 12, and when the auger is rotated it will convey the grain up through the conveyer section 28 and extension conveyer section 30 to be discharged from the hopper 12.

From the foregoing description it will be seen that the telescopic configuration of the auger tubes of the present invention result in a minimum of components which might obstruct the path of the movement of the grain to be conveyed from the cart 10. This speeds unloading and reduces the possibility of bridging of the components. The need for the cumbersome and space consuming slide rails and other components of the prior assemblies is avoided. The notch 50 and/or guide extension 52 at the bottom of the tube 42 also facilitate the movement of the tube 44 between its positions, supports the tube 44 when it is in the down position as shown in FIG. 2, and enlarges the size of the opening access to the auger 40 when the tube 44 is in its up operational position as seen in FIG. 3.

Another advantage of the present invention is that the auger tube 42, which is typically stationarily welded to the inclined wall 14 of the hopper 12, is protected against abrasion wear during the conveying operation by the auger tube 44 which covers its inner wall. This will greatly extend the life of the stationary fixed auger tube 42 and reduce the need for replacement of this difficult to replace auger tube 42. On the other hand, the auger tube 44 which will be subject to that abrasion and wear may be much more easily replaced simply by uncoupling the couple 56 of the fluid cylinder 54, sliding the worn tube 44 out of the auger tube 42, and replacing it with a new tube.

It will be appreciated that although the foregoing description is directed to a solid granular material handling system which includes a transportable grain cart, the principles of the present invention may be equally applicable to an auger conveyor in other types of installations and for conveying other forms of granular material.

It will also be understood that the preferred embodiment of the present invention which has been described is merely illustrative of the principles of the invention. Numerous modifications may be made by those skilled in the art without departing from the true spirit and scope of the invention.

I claim:

1. An auger assembly for conveying a solid granular material, comprising:
    an elongate rotatable auger;
    a first tube at least partially surrounding said auger over a first portion of the length of said auger, said first tube having an elongate inner wall;
    a coupling for coupling said auger to a source of power for transmitting power to said auger to rotate said auger in said first tube;
    a second tube also at least partially surrounding said auger over a portion of the length of said auger; and a drive mechanism for longitudinally moving said second tube between a first position in which said second tube extends from said first tube, and substantially over a second portion of the length of said auger, and a second position in which said second tube extends over a substantial amount of said first portion and over substantially all of said elongate inner wall, and in which said second portion of the length of said auger is exposed.

2. The auger assembly of claim 1, wherein said tubes substantially surround the respective portions of the length of the auger when said second tube is in its respective first and second positions.

3. The auger assembly of claim 1, wherein said second tube is moved telescopically relative to said first tube when said second tube is moved between said first and second positions.

4. The auger assembly of claim 3, wherein said second tube moves into said first tube and around said auger when it moves to said second position, said second tube being positioned between said auger and said first tube when said second tube is in said second position.

5. The auger assembly of claim 4, wherein said drive mechanism comprises a fluid cylinder.

6. The auger assembly of claim 5, wherein said fluid cylinder is hydraulic.

7. The auger assembly of claim 2, wherein said second tube is moved telescopically relative to said first tube when said second tube is moved between said first and second positions, wherein said second tube moves into said first tube and around said auger when it moves to said second position, said second tube being positioned between said auger and said first tube when said second tube is in said second position, and wherein said drive mechanism comprises a fluid cylinder.

8. The auger assembly of claim 1, wherein said first tube is notched at an end thereof adjacent said second portion of said auger.

9. A system for the handling of a solid granular material, comprising:
   a hopper having a top and a bottom and inclined walls which are inclined toward each other toward the bottom of said hopper;
   an elongate rotatable auger extending from adjacent said bottom to adjacent said top of said hopper;
   a first tube at least partially surrounding said auger over a first portion of the length of said auger nearest said top of said hopper, said first tube having an elongate inner wall;
   a coupling for coupling said auger to a source of power for transmitting power to said auger to rotate said auger in said first tube;
   a second tube also at least partially surrounding said auger over a portion of the length of said auger; and
   a drive mechanism for longitudinally moving said second tube between a first position in which said second tube extends from said first tube and toward said bottom of said hopper, and substantially over a second portion of the length of said auger, and a second position in which said second tube extends over a substantial amount of said first portion toward said top of said hopper and over substantially all of said elongate inner wall, and in which said second portion of the length of said auger is exposed toward said bottom of said hopper.

10. The system of claim 9, wherein said tubes substantially surround the respective portions of the length of the auger when said second tube is in its espective first and second positions.

11. The system of claim 9, wherein said second tube is moved telescopically relative to said first tube when said second tube is moved between said first and second positions.

12. The system of claim 11, wherein said second tube moves into said first tube and around said auger when it moves to said second position, said second tube being positioned between said auger and said first tube when said second tube is in said second position.

13. The system of claim 12, wherein said drive mechanism comprises a fluid cylinder.

14. The system of claim 13, wherein said fluid cylinder is hydraulic.

15. The system of claim 10, wherein said second tube is moved telescopically relative to said first tube when said second tube is moved between said first and second positions, wherein said second tube moves into said first tube and around said auger when it moves to said second position, said second tube being positioned between said auger and said first tube when said second tube is in said second position, and wherein said drive mechanism comprises a fluid cylinder.

16. The system of claim 9, wherein said first tube is notched at an end thereof adjacent said second portion of said auger.

17. The system of claim 9, wherein said auger extends beyond said top of said hopper, and a third tube which also extends above said top of said hopper and is hingly mounted to the top of said first tube.

18. The system of claim 9, including a transport assembly for transporting said hopper between different locations.

19. The auger assembly of claim 1, wherein when said second tube is in its second position, said second portion of the length of said auger is exposed in substantially its entirety and without obstruction.

20. The system of claim 9, wherein when said second tube is in its second position, said second portion of the length of said auger is exposed in substantially its entirety and without obstruction.

21. An auger assembly for conveying a solid granular material, comprising:
   an elongate rotatable auger;
   a first tube at least partially surrounding said auger over a first portion of the length of said auger;
   a coupling for coupling said auger to a source of power for transmitting power to said auger to rotate said auger in said first tube;
   a second tube also at least partially surrounding said auger over a portion of the length of said auger; and
   a drive mechanism for longitudinally moving said second tube between a first position in which said second tube extends from said first tube, and substantially over a second portion of the length of said auger, and a second position in which said second tube extends over a substantial amount of said first portion and in which said second portion of the length of said auger is exposed in substantially its entirety and without obstruction.

22. The auger assembly of claim 21, wherein said tubes substantially surround the respective portions of the length of the auger when said second tube is in its respective first and second positions.

23. The auger assembly of claim 21, wherein said second tube is moved telescopically relative to said first tube when said second tube is moved between said first and second positions.

24. The auger assembly of claim 23, wherein said second tube moves into said first tube and around said auger when it moves to said second position, said second tube being positioned between said auger and said first tube when said second tube is in said second position.

25. The auger assembly of claim 24, wherein said drive mechanism comprises a fluid cylinder.

26. The auger assembly of claim 25, wherein said fluid cylinder is hydraulic.

27. The auger assembly of claim 22, wherein said second tube is moved telescopically relative to said first tube when said second tube is moved between said first and second positions, wherein said second tube moves into said first tube and around said auger when it moves to said second position, said second tube being positioned between said auger and said first tube when said second tube is in said second position, and wherein said drive mechanism comprises a fluid cylinder.

28. The auger assembly of claim 21, wherein said first tube is notched at an end thereof adjacent said second portion of said auger.

29. A system for the handling of a solid granular material, comprising:

a hopper having a top and a bottom and inclined walls which are inclined toward each other toward the bottom of said hopper;

an elongate rotatable auger extending from adjacent said bottom to adjacent said top of said hopper;

a first tube at least partially surrounding said auger over a first portion of the length of said auger nearest said top of said hopper;

a coupling for coupling said auger to a source of power for transmitting power to said auger to rotate said auger in said first tube;

a second tube also at least partially surrounding said auger over a portion of the length of said auger; and a drive mechanism for longitudinally moving said second tube between a first position in which said second tube extends from said first tube and toward said bottom of said hopper, and substantially over a second portion of the length of said auger, and a second position in which said second tube extends over a substantial amount of said first portion toward said top of said hopper and in which said second portion of the length of said auger is exposed in substantially its entirety and without obstruction toward said bottom of said hopper.

30. The system of claim 29, wherein said tubes substantially surround the respective portions of the length of the auger when said second tube is in its respective first and second positions.

31. The system of claim 29, wherein said second tube is moved telescopically relative to said first tube when said second tube is moved between said first and second positions.

32. The system of claim 31, wherein said second tube moves into said first tube and around said auger when it moves to said second position, said second tube being positioned between said auger and said first tube when said second tube is in said second position.

33. The system of claim 32, wherein said drive mechanism comprises a fluid cylinder.

34. The system of claim 33, wherein said fluid cylinder is hydraulic.

35. The system of claim 30, wherein said second tube is moved telescopically relative to said first tube when said second tube is moved between said first and second positions, wherein said second tube moves into said first tube and around said auger when it moves to said second position, said second tube being positioned between said auger and said first tube when said second tube is in said second position, and wherein said drive mechanism comprises a fluid cylinder.

36. The system of claim 29, wherein said first tube is notched at an end thereof adjacent said second portion of said auger.

37. The system of claim 29, wherein said auger extends beyond said top of said hopper, and a third tube which also extends above said top of said hopper and is hingedly mounted to the top of said first tube.

38. The system of claim 29, including a transport assembly for transporting said hopper between different locations.

* * * * *